(12) United States Patent
Ahlgren et al.

(10) Patent No.: US 7,986,917 B2
(45) Date of Patent: Jul. 26, 2011

(54) METHOD AND SYSTEM FOR DATA TRANSFER FROM A HAND HELD DEVICE

(75) Inventors: Erik Ahlgren, Malmö (SE); Linda Meiby, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 782 days.

(21) Appl. No.: 11/456,431

(22) Filed: Jul. 10, 2006

(65) Prior Publication Data
US 2008/0039212 A1 Feb. 14, 2008

(51) Int. Cl.
*H04B 7/00* (2006.01)
*A63B 67/00* (2006.01)

(52) U.S. Cl. .......................... 455/41.2; 463/49

(58) Field of Classification Search .................. None
See application file for complete search history.

(56) References Cited

U.S. PATENT DOCUMENTS

| 7,019,639 | B2* | 3/2006 | Stilp | 340/531 |
| 7,091,997 | B2* | 8/2006 | Kidney et al. | 715/716 |
| 2002/0190856 | A1* | 12/2002 | Howard | 340/531 |
| 2002/0193080 | A1* | 12/2002 | Komsi et al. | 455/90 |
| 2003/0103091 | A1 | 6/2003 | Wong et al. | |
| 2004/0139217 | A1 | 7/2004 | Kidney et al. | |
| 2004/0176032 | A1* | 9/2004 | Kotola et al. | 455/41.2 |
| 2004/0179545 | A1* | 9/2004 | Erola et al. | 370/449 |
| 2005/0003804 | A1* | 1/2005 | Huomo et al. | 455/414.1 |
| 2005/0007239 | A1* | 1/2005 | Woodard et al. | 340/10.2 |
| 2005/0101314 | A1 | 5/2005 | Levi | |
| 2005/0212749 | A1* | 9/2005 | Marvit et al. | 345/156 |
| 2005/0212750 | A1 | 9/2005 | Marvit et al. | |
| 2005/0222801 | A1 | 10/2005 | Wulff et al. | |
| 2005/0239468 | A1* | 10/2005 | Segal | 455/444 |
| 2005/0265284 | A1* | 12/2005 | Hsu et al. | 370/331 |
| 2006/0005156 | A1 | 1/2006 | Korpipaa et al. | |
| 2006/0092866 | A1* | 5/2006 | Kim et al. | 370/310 |
| 2006/0128350 | A1* | 6/2006 | Hurwitz et al. | 455/343.2 |
| 2006/0224048 | A1* | 10/2006 | Devaul et al. | 600/300 |
| 2006/0256074 | A1* | 11/2006 | Krum et al. | 345/156 |
| 2007/0270218 | A1* | 11/2007 | Yoshida et al. | 463/37 |

FOREIGN PATENT DOCUMENTS

| DE | 102004061169 | | 6/2006 |
| EP | 1132933 | | 12/2001 |
| GB | 2347593 | | 9/2000 |
| WO | 2004062131 | | 7/2004 |
| WO | WO2004062131 | * | 7/2004 |

(Continued)

OTHER PUBLICATIONS

International Search Report and Written Opinion from International Application No. PCT/IB06/003459, Apr. 12, 2006.

(Continued)

*Primary Examiner* — Yuwen Pan
*Assistant Examiner* — Ayodeji Ayotunde
(74) *Attorney, Agent, or Firm* — Renner, Otto, Boisselle & Sklar, LLP

(57) ABSTRACT

A method of transferring data from a hand held electronic device to a target electronic device includes establishing a wireless interface between the hand held electronic device and the target electronic device. A transfer motion that includes rotation of the hand held electronic device is detected. Upon detection of the transfer motion, the data is transmitted from the hand held electronic device to the target electronic device over the wireless interface. The wireless interface may be initiated and configured using a localized communication link.

19 Claims, 4 Drawing Sheets

FOREIGN PATENT DOCUMENTS

| | | | |
|---|---|---|---|
| WO | WO 2004062131 A1 | * | 7/2004 |
| WO | 2004075169 | | 9/2004 |
| WO | 2005076542 | | 8/2005 |
| WO | 2005093550 | | 10/2005 |
| WO | 2005-103860 | | 11/2005 |
| WO | 2006127270 | | 11/2006 |
| WO | WO2006127270 | * | 11/2006 |
| WO | WO 2006127270 | * | 11/2006 |

OTHER PUBLICATIONS

International Preliminary Report on Patentability from corresponding International Application No. PCT/IB07/000017, Apr. 1, 2007.
International Search Report from corresponding International Application No. PCT/IB2007/000017, Apr. 1, 2007.

* cited by examiner

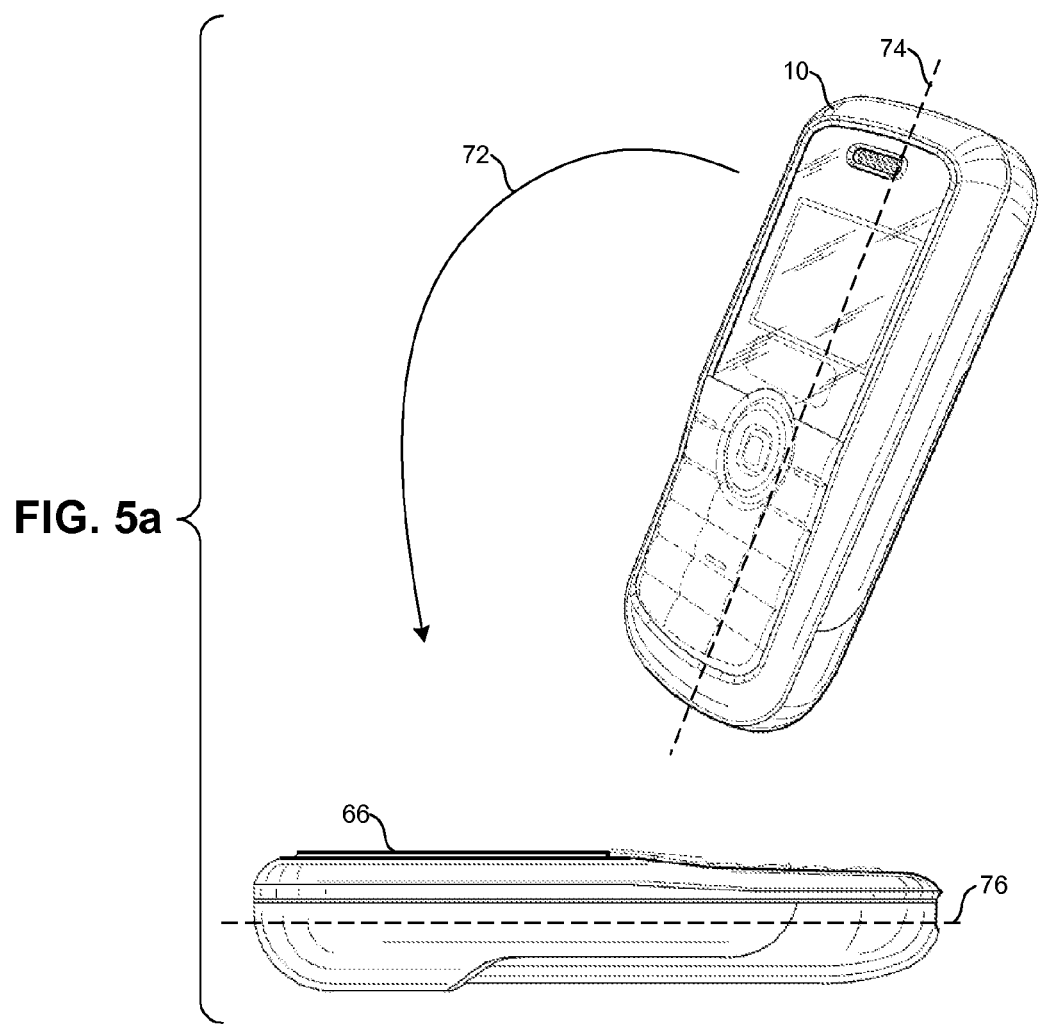

METHOD AND SYSTEM FOR DATA TRANSFER FROM A HAND HELD DEVICE

TECHNICAL FIELD OF THE INVENTION

The present invention relates generally to hand held electronic equipment, such as electronic equipment for engaging in voice communications. More particularly, the invention relates to a method and system for transferring data from a hand held device to another device.

DESCRIPTION OF THE RELATED ART

Mobile and/or wireless electronic devices are becoming increasingly popular. For example, mobile telephones and portable media players are now in wide-spread use. In addition, the features associated with certain types of electronic devices have become increasingly diverse. To name a few examples, many electronic devices have cameras, text messaging capability, Internet browsing functionality, electronic mail capability, video playback capability, audio playback capability, image display capability and hands-free headset interfaces.

As will be appreciated, many hand held electronic devices are capable of storing data. The data may take may forms, examples of which include contact list entries, audio files (e.g., an MP3 file containing music), image files (e.g., a JPG file containing a photograph), video files, data files (e.g., a word processing document or a spreadsheet) and executable applications (programs).

Some hand held devices allow the user to transfer stored data to another hand held device or other item of electronic equipment (e.g., a desktop or laptop computer) using a wireless interface, such as a Bluetooth interface, an infrared (IR) interface, or another mechanism. As used herein, the term transfer includes copying data so that the originating device and the target device each store the data after transfer. Data transfer also may refer to moving data so that only the target device stores the data after transfer.

However, conventional interfaces over which data may be transferred are somewhat inconvenient to use and are not very intuitive. For example, using a Bluetooth approach to transfer data may require turning on the Bluetooth functions of both devices, waiting a period of time for one device to detect the other device, selecting the data transfer target device, and then transmitting the data to the target device. From a user standpoint, it is not always clear or easily known what steps or functions need to be taken and which menus need to be traversed to transfer data from his or her hand held device to anther device.

SUMMARY

In view of the above-mentioned shortcomings associated with conventional data transfer approaches, there is a need in the art to facilitate transferring of data from one electronic device to another.

According to one aspect of the invention, a method of transferring data from a hand held electronic device to a target electronic device includes establishing a wireless interface between the hand held electronic device and the target electronic device; detecting a transfer motion of the hand held electronic device, the transfer motion including rotation of the hand held electronic device; and upon detection of the transfer motion, transmitting the data from the hand held electronic device to the target electronic device over the wireless interface.

According to one embodiment of the method, the establishing of the wireless interface includes detecting a proximate physical relationship of the hand held electronic device and the target electronic device using a localized communications link.

According to one embodiment of the method, the localized communication link is near field communication (NFC).

According to one embodiment, the method further includes initiating and configuring the wireless interface with the NFC.

According to one embodiment of the method, the wireless interface is selected from Bluetooth, WiFi, WLAN and Infrared.

According to one embodiment of the method, the transfer motion includes rotating a top portion of the hand held electronic device from pointing away from the target electronic device to pointing toward the target electronic device.

According to one embodiment of the method, the transfer motion includes moving the hand held electronic device such that a longitudinal axis of the hand held electronic device crosses through a horizontal plane.

According to one embodiment of the method, the transfer motion includes changing an angle of a longitudinal axis of the hand held electronic device a predetermined number of degrees with respect to a horizontal plane.

According to one embodiment of the method, changing of the angle does not include rotating the longitudinal axis through a horizontal position.

According to one embodiment of the method, changing of the angle includes rotating the longitudinal axis through a horizontal position.

According to one embodiment, the method further includes manipulating an image shown on a display of the hand held electronic device during the data transfer to visually mimic a fluid subjected to the transfer motion.

According to one embodiment of the method, the hand held electronic device is a mobile radio terminal.

According to another aspect of the invention, a hand held electronic device is configured to transfer data to a target electronic device and includes a localized communicator for detecting a proximate physical relationship of the hand held electronic device and the target electronic device; a local wireless interface for establishing a wireless interface between the hand held electronic device and the target electronic device in response to detection of the proximate physical relationship; and a sensor for detecting movement of the hand held electronic device, wherein upon detecting a specified transfer motion of the hand held electronic device, the hand held electronic device transmitting the data to the target electronic device over the wireless interface.

According to one embodiment, the hand held electronic device further includes a memory for storing the data.

According to one embodiment of the hand held electronic device, the localized communicator is a near field communication (NFC) chipset.

According to one embodiment of the hand held electronic device, the NFC chipset initiates and configures the wireless interface.

According to one embodiment of the hand held electronic device, the transfer motion includes rotating a top portion of the hand held electronic device from pointing away from the target electronic device to pointing toward the target electronic device.

According to one embodiment of the hand held electronic device, the transfer motion includes changing an angle of a longitudinal axis of the hand held electronic device a predetermined number of degrees with respect to a horizontal plane.

According to one embodiment, the hand held electronic device further includes a display and a controller, the controller manipulating an image shown on the display during the data transfer to visually mimic a fluid subjected to the transfer motion.

According to one embodiment of the hand held electronic device, the hand held electronic device is a mobile radio terminal.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIGS. 5a and 5b are schematic illustrations of two mobile telephones having relative orientations at different stages during a data transfer in accordance with the present invention.

DETAILED DESCRIPTION OF EMBODIMENTS

Figure 1:
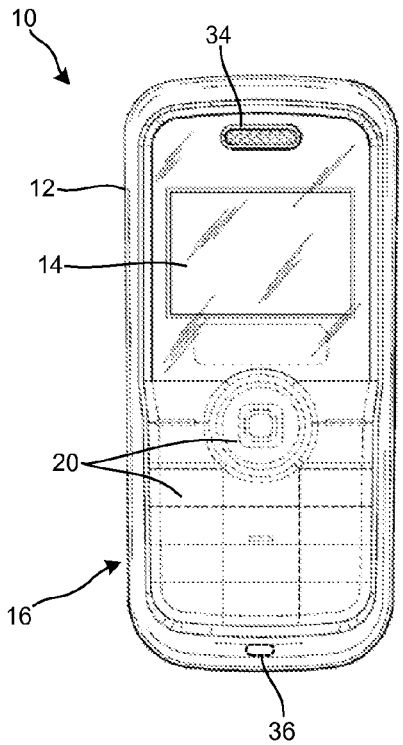
FIG. 1 is a schematic view of a mobile telephone as an exemplary electronic equipment in accordance with an embodiment of the present invention.

The present invention will now be described with reference to the drawings, wherein like reference numerals are used to refer to like elements throughout. It will be understood that the figures are not necessarily to scale The term "electronic equipment" includes portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like. The term "electronic equipment" also may include portable audiovisual players (e.g., MP3 players and video players), computers, etc.

In the present application, the invention is described primarily in the context of a mobile telephone. However, it will be appreciated that the invention is not intended to be limited to a mobile telephone and can be any type of electronic equipment.

Figure 2:
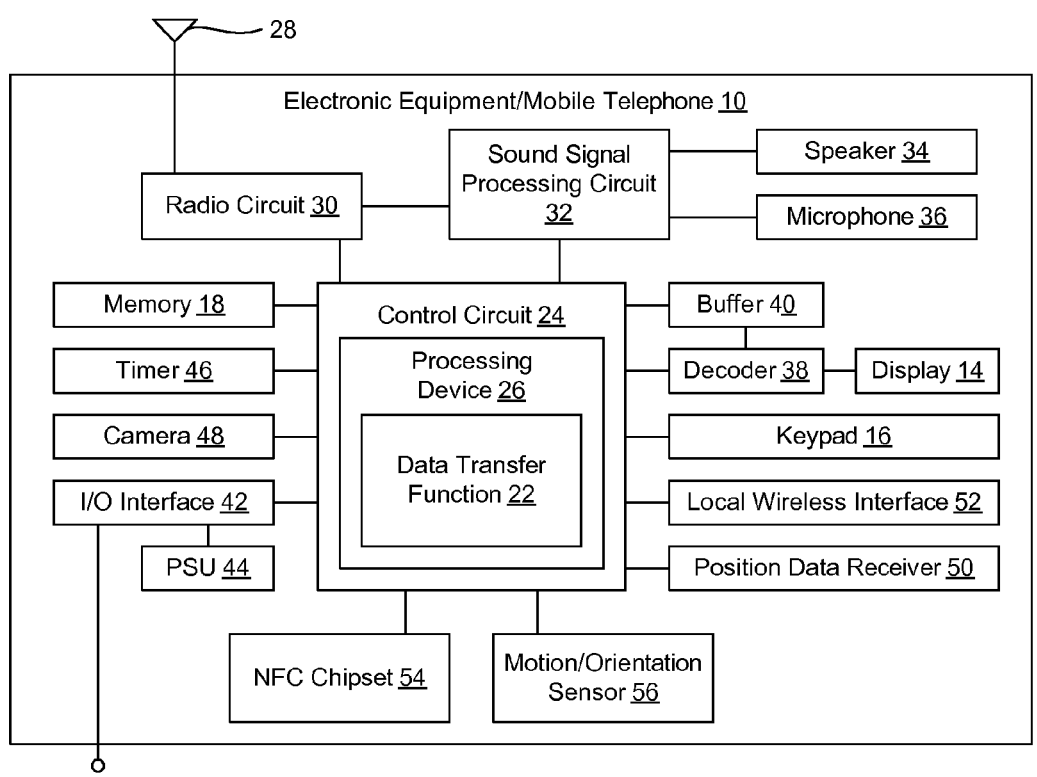
FIG. 2 is a schematic block diagram of the relevant portions of the mobile telephone of FIG. 1 in accordance with an embodiment of the present invention.

Referring initially to FIGS. 1 and 2, an electronic equipment 10 is shown in accordance with the present invention. The electronic equipment includes a data transfer function 22 that is configured to transfer data stored by the electronic equipment 10 to another item of electronic equipment. The data transfer function 22 and operation of the electronic equipment 10 to transfer data will be described in greater detail below. The device from which data is transferred also may be referred to the originating device and the device to which data is transferred also may be referred to as the target device. The data transfer function 22 may be embodied as a program or code that is executed by the originating device. The target device also may execute the data transfer function 22 in coordination with the originating device. Alternatively, the target device may execute other logical routines that support data transfer from the originating device as the originating device operates in accordance with the data transfer function 22. Thus, each of the originating device and the target device may include the data transfer function 22 or, in some embodiments, the originating device includes the data transfer function 22 and the target device includes operational logic that is compatible with the originating device.

The data transfer function 22 may be executed to by the originating device to detect the presence of the target device (e.g., by using near field communication or NFC), establish a wireless interface with the target device (e.g., Bluetooth, WLAN, WiFi, infrared or other interface that is initiated and possibly configured using NFC), sense a specified motion of the originating device (e.g., a tilting or "pouring" motion) and, upon sensing the specified motion, transfer the data. The transferred data may be a file selected by the user by navigating through a graphical file structure, contact information corresponding to selected contact from a contact list or data associated with currently displayed images (e.g., graphical image, text, audio file header information, etc.).

The electronic equipment in the illustrated embodiments is a mobile telephone and will be referred to as the mobile telephone 10. As indicated, the description and illustrations of a mobile telephone for the electronic equipment is intended to serve as a non-limiting exemplary environment for the inventive concepts described herein. The mobile telephone 10 is shown as having a "brick" or "block" form factor housing 12, but it will be appreciated that other type housings, such as a clamshell housing or a slide-type housing, may be utilized.

The mobile telephone 10 includes a display 14 and keypad 16. As is conventional, the display 14 displays information to a user such as operating state, time, telephone numbers, contact information, various navigational menus, etc., which enable the user to utilize the various feature of the mobile telephone 10. The display 14 may also be used to visually display content received by the mobile telephone 10 and/or retrieved from a memory 18 (FIG. 2) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14. While some embodiments of the data transfer function 22 do not involve keypad 16 based user interaction with the mobile telephone 10, other embodiments may include keypad 16 interaction with the data transfer function 22, such as setting up various options, data selection, and so forth.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. The call circuitry also may be responsible for transmitting text messages that are prepared by the user.

FIG. 2 represents a functional block diagram of the mobile telephone 10. For the sake of brevity, generally conventional features of the mobile telephone 10 will not be described in great detail herein. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out operation of the mobile telephone 10. The memory 18 may be, for example, one or more of a buffer, a flash memory, a hard drive, a removable media, a volatile memory, a non-volatile memory or other suitable device. In addition to handling voice communications, the mobile telephone 10 may be configured to transmit, receive and process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth. In addition, the processing device 26 executes code in order to perform the data transfer function 22.

It will be apparent to a person having ordinary skill in the art of computer programming, and specifically in applications programming for mobile telephones or other electronic devices, how to program a mobile telephone 10 to operate and carry out the functions described herein. Accordingly, details as to the specific programming code have been left out for the sake of brevity. Also, while the data transfer function 22 is executed by the processing device 26 in accordance with the preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive data and/or audiovisual content. For example, the receiver may be an IP datacast receiver compatible with a hybrid network structure that provides mobile communications and digital broadcast services, such as DVB-H mobile television and/or mobile radio. Other receivers for interaction with a mobile radio network or broadcasting network are possible and include, for example, GSM, CDMA, WCDMA, MBMS, WiFi, WiMax, DVB-H, ISDB-T, etc, as well as advanced versions of these standards.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation. Audio data may be passed from the control circuit 24 to the sound signal processing circuit 32 for playback to the user. The audio data may include, for example, audio data from an audio file stored by the memory 18 and retrieved by the control circuit 24. The sound processing circuit 32 may include any appropriate buffers, decoders, amplifiers and so forth.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18, derived from an incoming video data stream received by the radio circuit 30 or obtained by any other suitable method. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown), such as a headset (sometimes referred to as an earset) to audibly output sound signals output by the sound processing circuit 32 to the user. Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 also may include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like.

The mobile telephone 10 also may include a local wireless interface 52, such as an infrared transceiver and/or an RF adaptor (e.g., a Bluetooth adapter, WLAN adapter, WiFi adapter, etc.), for establishing communication with an accessory, a hands-free adaptor (e.g., a headset that may audibly output sounds corresponding to audio data transferred from the mobile telephone 10 to the adapter), another mobile radio terminal, a computer or another device. As will be appreciated, the local wireless interface 52 may be used to transmit data from the mobile telephone 10 when the mobile telephone 10 functions as an originating device during a data transfer operation and receive data from another device when the mobile telephone 10 functions as a target device during a data transfer operation.

The mobile telephone 10 also may include a near field communication (NFC) chipset 54 or comparable communication component (e.g., localized communicator) to establish a localized communication link with a compatible component of another device when the devices are brought in relatively close proximity to each other. The term NFC is generally used to refer to a magnetic field induction communication interface and protocol that was jointly developed by Sony and Phillips and which has been adopted as standards by ECMA (ECMA-340) and ISO/IEC (ISO/IEC 18092). NFC generally has a working distance of about zero centimeters to about twenty centimeters. NFC may be used in a passive communication mode where an initiator device provides a carrier field and that is answered by modulating the existing field with a transponder, which may draw operating power from the initiator-provided electro-magnetic field. NFC also may be used in an active communication mode where both the initiator and transponder communicate by generating their own fields, in which case both the initiator and the transponder typically receive power from a power supply. NFC may be used to configure and initiate another wireless network connection between devices, such as Bluetooth and WiFi connections.

As will be appreciated, the illustration and description of an NFC chipset 54 is meant to be an example of a close proximity communication device and any appropriate device to establish a localized communication link may be used and may include devices that rely on a capacitive coupling technique, a propagating wave (e.g., electromagnetic) technique, a radio frequency transmission technique (e.g., such as the techniques used for RF identification (RFID) devices), a magnetic field induction technique or any other appropriate technique.

The mobile telephone 10 also may include one or more sensors 56 that output a signal (or signals) indicative of movement of the mobile telephone 10 and/or the orientation of the mobile telephone 10. The sensor(s) 56 may include signal processing circuitry to condition raw sensor data into a meaningful input to the data transfer function 22. The sensor(s) 56 may provide information to the data transfer function 22 so that the data transfer function 22 may detect whether the mobile telephone 10 has been moved in a specified manner. For instance, the sensor(s) 56 may detect movement of the mobile telephone 10 (e.g., shaking or repositioning of the mobile telephone 10) and/or changes in mobile telephone 10 orientation (e.g., a turning of the mobile telephone 10 from an upright position to sideways or inverted orientation).

The sensor(s) 56 may include any appropriate transducer and circuitry. Exemplary sensors include a motion sensors, accelerometers, position sensors, rotation sensors, and so on. It will be appreciated that a suitable motion and/or orientation transducer may be any device, circuit or other mechanism or combination thereof that provides an indication that motion has been sensed and/or provides an indication of the character of the motion, such as, for example, acceleration, velocity, direction, directional change or any other characterization of the motion. An example, as is mentioned above, is an accelerometer that provides an electrical output (or some other output) in response to acceleration. Another example is a velocimeter that provides an output representative of velocity. One other example of a motion transducer is a small electric generator configured to generate an electrical output in response to motion, the character of which (e.g., duration, amplitude, frequency, or some other character) may be used to represent motion of the mobile phone. In still another example, the sensor(s) 56 may be implemented with proximity sensors, used to sense proximity of the mobile telephone 10 to another object, such as the target device for data transfer. Multiple proximity sensors may be employed to determine which part of the mobile telephone 10 is closest to or pointing towards the target device at various moments in time.

In other embodiments, the sensor(s) 56 may be implemented as a signal detector that responds to changes in electrical signals, radio frequency signals, or some other signals, such as amplitude or frequency or changes therein, Doppler shift, or some other discernible change that occurs due to motion. For instance, motion detection may use an interface system (e.g., NFC, Bluetooth, etc.) to detect signal variations or relationships. In the Bluetooth example, if interfaces in both the mobile telephone 10 and the target device are turned on, motion signal processing circuitry may be used to detect variations (or lack thereof) in the signals of one of the devices. For example, if the mobile telephone 10 were held in one hand and moved relative to the target device, it is likely that there would be change in the relationship of exchanged signals, indicating movement of one of the devices.

Figure 3:
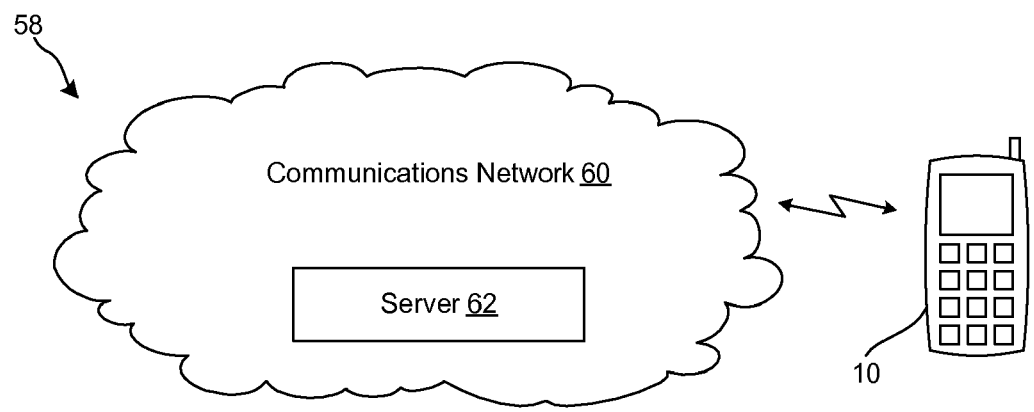
FIG. 3 is a schematic diagram of a communications system in which the mobile telephone of FIG. 1 may operate.

With additional reference to FIG. 3, the mobile telephone 10 may be configured to operate as part of a communications system 58. The system 58 may include a communications network 60 having a server 62 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower (e.g., cellular tower), another mobile telephone, a wireless access point, a satellite, etc. Portions of the network may include wireless transmission pathways. The network 60 may support the communications activity of multiple mobile telephones 10, although only one mobile telephone 10 is shown in the illustration of FIG. 3.

In one embodiment, the server 62 may operate in stand alone configuration relative to other servers of the network 60 or may be configured to carry out multiple communications network 60 functions. As will be appreciated, the server 62 may be configured as a typical computer system used to carry out server functions and may include a processor configured to execute software containing logical instructions that embody the functions of the server 62.

Figure 4:
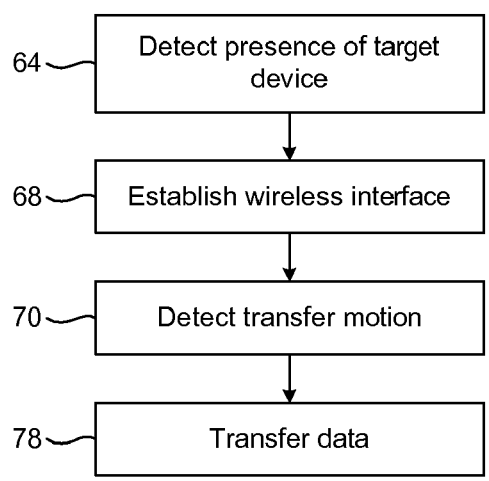
FIG. 4 is a flow chart of an exemplary data transfer function in accordance with the present invention.

With additional reference to FIG. 4, illustrated is a flow chart of logical blocks that make up the data transfer function 22. The flow chart may be thought of as depicting steps of a method. Although FIG. 4 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The additional reference to FIG. 5*a*, the logical flow may begin in block 64 where the mobile telephone 10, acting as an originating device, detects the presence of another item of electronic equipment, or target device 66. It will be appreciated that the target device 66 may detect the presence of the mobile telephone 10 instead of or in addition to the mobile telephone 10 detecting the presence of the target device 66. In the illustrated embodiment, the target device 66 is another mobile telephone, but it will be appreciated that the target device 66 may be any other device to which data may be transferred from the originating device (e.g., the mobile telephone 10 in the illustrated embodiment).

Detection of the target device 66 may be accomplished using any suitable localized communication link. In a preferred embodiment, NFC is used by way of the NFC chipset 54 to detect when the mobile telephone 10 is within NFC range of the target device 66.

Proceeding now to block 68, a wireless interface between the mobile telephone 10 and the target device 66 may be established. The wireless interface may be any wireless communication or network connection that allows for efficient transfer of data, such as Bluetooth, WiFi (e.g., operating under the IEEE 802.11 standard), Infrared or other WLAN connection. As indicated, NFC may be used to configure and initiate the wireless interface between the mobile telephone 10 and the target device 66. Thus, when the two devices 10, 66 are brought within relatively close proximity of each other, the devices 10, 66 may automatically recognize the presence of each other (block 64) and automatically activate a wireless interface over which data may be exchanged (block 68). In this embodiment, user interaction with the mobile telephone 10 or the target device 66 to configure the interface is not needed or is kept to a minimum. In one embodiment, user authorization to establish the wireless interface may be solicited as part of block 68. Manual or partially manual interface establishment may alternatively be used in block 68.

Next, in block 70, the logical flow may wait until a specified motion of the originating device (mobile telephone 10) is detected. The specified motion may be referred to as a transfer motion (represented by arrow 72), which may be an intuitive movement of the mobile telephone 10. In one embodiment, the transfer motion is a tilting or "pouring" motion that resembles the pouring of a liquid from a pitcher into a glass. Pour of a liquid from a pitcher to a glass relies on gravity and proper alignment of the pitcher over the glass. It will be appreciated that wireless data transfer does not rely on these parameters. As such, the mobile telephone 10 may or may not be located over the target device 66. For instance, the mobile telephone 10 may be located below the target device 66 or to the side of the target device 66 when the transfer motion 72 is carried out. Also, the mobile telephone 10 need not be rotated to the extent that a pitcher would to pour liquid, especially when the transfer motion 72 is a movement other than a tilting movement.

Figure 5B:
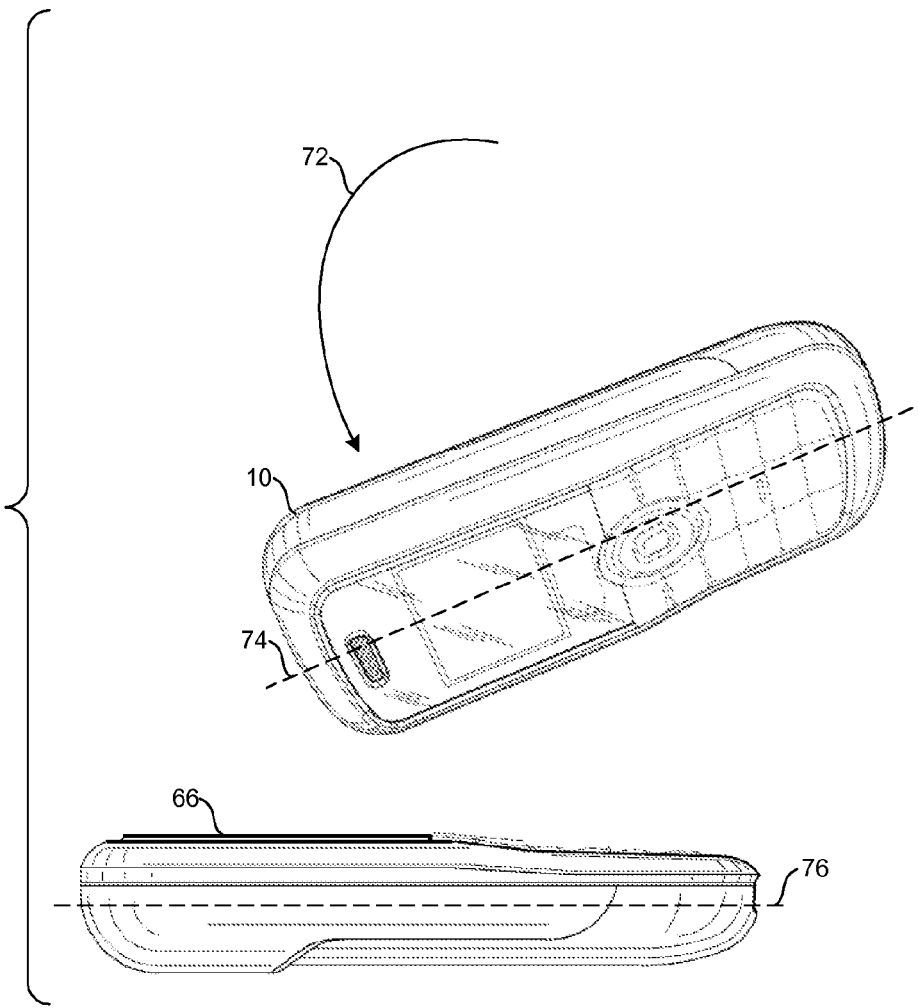

In the example shown in FIGS. 5a and 5b, the transfer motion 72 may involve rotating a top or upper end of the mobile telephone 10 from pointing away from the target device 66 to pointing toward the target device 66. The rotating may include moving the mobile telephone 10 such that a longitudinal axis 74 of the mobile telephone 10 crosses through a horizontal plane 76 (e.g., the longitudinal axis 74 when drawn from a bottom to a top of the mobile telephone 10 starts with a positive angle with respect to the horizontal plane 76 and ends with a negative angle with respect to the horizontal plane 76). The horizontal plane 76 may or may not extend through the target device 66.

In other embodiments, the transfer motion 72 may involve moving an angle of the longitudinal axis 74 with respect to the horizontal plane 76 a predetermined number of degrees, and such change in angle may or may not include rotating the longitudinal axis 74 through a horizontal position. For instance, the number of degrees may be equal to or greater than 90 degrees and, in another embodiment, the number of degrees may be equal to or greater than 60 degrees.

While the embodiments described above include some form of mobile telephone 10 rotation, other transfer motions 72 are contemplated. Other transfer motions 72 may include, for example, shaking (e.g., similar to shaking of a salt shaker), moving toward to the target device 66, squeezing the mobile telephone 10 (e.g., similar to squeezing a sponge, which may be detected by pressure transducers), and so forth. Also, these or other motions may be combined with each other and/or with rotation of the mobile telephone 10.

Next, in block 78, if the transfer motion 72 is detected, data may be transferred from the mobile telephone 10 to the target device 66. In one embodiment, the data to be transferred may be selected by the user. For example, prior to performing the transfer motion 72, the user may navigate to a desired file (e.g., music file, image file, video file, ring tone, word processing file, spreadsheet file, electronic mail message, program, etc.) stored by the memory 18 or navigate to a desired contact list entry, and select the desired file or entry for transfer. In another embodiment, the data transfer function 22 may be configured to transfer data that is related to the currently displayed image on the display 14. For instance, if a contact entry is highlighted or shown on the display, the data transfer of block 78 may involve transferring of the associated contact information to the target device 66. As another example, if content from a data file is displayed (e.g., text, image, etc.) or if file management information for a data file is displayed or highlighted, the data transfer of block 78 may involve transferring of the associated data file to the target device 66.

To summarize one embodiment of the data transfer function, when the originating and target devices 10, 66 are paired through blocks 64 and 68 and the transfer motion is detected 72 by the sensor(s) 56 of the originating device, selected data or data associated with the present image(s) on the display 14 may be transferred to the target device 66.

In one embodiment, the image shown on the display 14 during the data transfer may be manipulated (e.g., morphed) to mimic a fluid subjected to the transfer motion 72. For example, if the transfer motion 72 were a tilting motion similar to pouring liquid from a pitcher, the image on the display can be manipulated to look as if the image were flowing and pouring out of a top end of the display. In this embodiment, the displayed image is controlled to visually portray movement of data in a fluidic manner consistent with the transfer motion 72.

Similarly, these techniques may be used to transfer data from a stationary or moving device to a device moved in accordance with the transfer motion. For instance, following blocks 64 and 68, if the mobile telephone 10 were to be pulled away from the target device 66 (e.g., to mimic a pulling or extracting motion), the target device 66 (now acting as the originating device) may transfer data to the mobile telephone 10 (now acting as the data transfer target device).

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of transferring data from a hand held electronic device to a target electronic device, comprising:

detecting a proximate physical relationship of the hand held electronic device and the target electronic device using a near field communication (NFC) chipset and establishing a wireless interface between the hand held electronic device and the target electronic device, the wireless interface established using an RF interface device and the wireless interface initiated and configured using an NFC protocol of the NFC chipset;

detecting a transfer motion of the hand held electronic device, the transfer motion including rotation of a part of the hand held electronic device toward the target electronic device so that the part of the hand held electronic device becomes closer to the target electronic device than another part of the hand held electronic device during the rotation, wherein the step of detecting the transfer motion includes using a plurality of proximity sensors implemented as a signal detector that responds to a discernible change of a signal due to the transfer motion of the handheld electronic device relative and proximate to the target electronic device to sense a change in proximity of the part of the hand held electronic device with respect to the target electronic device; and upon detection of the proximate physical relationship and of the transfer motion of the hand held electronic device, transmitting the data from the hand held electronic device to the target electronic device over the wireless interface.

2. The method of claim 1, wherein the wireless interface is selected from one of Bluetooth, WiFi, or WLAN.

3. The method of claim 1, where the transfer motion includes rotating a top portion of the hand held electronic device from pointing away from the target electronic device to pointing toward the target electronic device.

4. The method of claim 1, wherein the transfer motion includes moving the hand held electronic device such that a longitudinal axis of the hand held electronic device crosses through a horizontal plane.

5. The method of claim 1, wherein the transfer motion includes changing an angle of a longitudinal axis of the hand held electronic device a predetermined number of degrees with respect to a horizontal plane.

6. The method of claim 5, wherein changing of the angle does not include rotating the longitudinal axis through a horizontal position.

7. The method of claim 5, wherein changing of the angle includes rotating the longitudinal axis through a horizontal position.

8. The method of claim 1, further comprising manipulating an image shown on a display of the hand held electronic device during the data transfer to visually mimic a fluid subjected to the transfer motion.

9. The method of claim 1, wherein the hand held electronic device is a mobile radio terminal.

10. A hand held electronic device configured to transfer data to a target electronic device, comprising:

a near field communication (NFC) chipset configured to detect a proximate physical relationship of the hand held electronic device and the target electronic device;

a local wireless interface configured to establish a wireless interface between the hand held electronic device and the target electronic device in response to detection of the proximate physical relationship, wherein the local wireless interface is an RF interface device and the local wireless interface is initiated and configured by an NFC protocol of the NFC chipset; and a plurality of proximity sensors implemented as a signal detector that responds to a discernible change of a signal due to the transfer motion of the handheld electronic device relative and proximate to the target electronic device and configured to sense a change in proximity of a part of the hand held electronic device with respect to the target electronic device, wherein upon detecting the proximate physical relationship of the hand held electronic device and a specified transfer motion including rotation of the part of the hand held electronic device toward the target electronic device so that the part of the hand held electronic device becomes closer to the target electronic device than another part of the hand held electronic device during the rotation, the hand held electronic device is configured to transmit the data to the target electronic device over the wireless interface.

11. The hand held electronic device of claim 10, further comprising a memory for storing the data.

12. The hand held electronic device of claim 10, where the transfer motion includes rotating a top portion of the hand held electronic device from pointing away from the target electronic device to pointing toward the target electronic device.

13. The hand held electronic device of claim 10, wherein the transfer motion includes changing an angle of a longitudinal axis of the hand held electronic device a predetermined number of degrees with respect to a horizontal plane.

14. The hand held electronic device of claim 10, further comprising a display and a controller, the controller manipulating an image shown on the display during the data transfer to visually mimic a fluid subjected to the transfer motion.

15. The hand held electronic device of claim 10, wherein the hand held electronic device is a mobile radio terminal.

16. The method of claim 1, wherein the plurality of proximity sensors output signals indicative of which part of the hand held electronic device is at least one of closest to or pointing towards the target electronic device.

17. The hand held electronic device of claim 10, wherein the plurality of proximity sensors output signals indicative of which part of the hand held electronic device is at least one of closest to or pointing towards the target electronic device.

18. The method of claim 1, wherein the plurality of proximity sensors respond to a discernible change of at least one of amplitude, frequency, or Doppler shift in at least one of an electrical signal or radio frequency signal.

19. The hand held electronic device of claim 10, wherein the plurality of proximity sensors respond to a discernible change of at least one of amplitude, frequency, or Doppler shift in at least one of an electrical signal or radio frequency signal.

* * * * *